United States Patent [19]

Bukrinsky et al.

[11] 4,056,436

[45] Nov. 1, 1977

[54] SYSTEM FOR MITIGATING THE EFFECTS OF AN ACCIDENT AT A NUCLEAR POWER PLANT

[76] Inventors: Anatoly Matveevich Bukrinsky, prospekt Vernadskogo, 119, kv. 19; Genrikh Vladimirovich Matskevich, Sevanskaya ulitsa, 7, kv. 66; Julian Vulfovich Rzheznikov, Michurinsky prospekt, 16, kv. 35; Andrei Borisovich Sukhov, ulitsa Krupskoi, 15, kv. 75; Viktor Petrovich Tatarnikov, ulitsa Chusovskaya, 11, korpus 8, kv. 24; Viktor Mozesovich Berkovich, Sakhalinskaya ulitsa, 6, korpus 1, kv. 156, all of Moscow; Jury Nikolaevich Remzhin, ulitsa Vasi Alexeeva, 24, kv. 20, Leningrad; Lev Nikolaevich Slepnev, Novocherkassky prospekt, 18, kv. 221, Leningrad; Alexandr Anatolievich Sverdlov, ulitsa Zhelyabova, 1, kv. 69, Leningrad; Vladimir Geselevich Karan, ulitsa Uralskaya, 46, kv. 97, Sverdlovsk; Jury Petrovich Kaloshin, Verkhne-Pervomaiskaya ulitsa, 14, kv. 17, Moscow; Anatoly Nikolaevich Krasikov, Inzhenernaya ulitsa, 32, kv. 42; Evgeny Akimovich Babenko, Inzhenernaya ulitsa, 32, kv. 12, both of Sverdlovsk; Vladimir Konstantinovich Bronnikov, ulitsa Pobedy, 102, kv. 2, Gorlovka Donetskoi oblasti; Jury Vasilievich Shvyryaev, Dnepropetrovskaya ulitsa, 23, korpus 3, kv. 117, Moscow; Boris Semenovich Shiryaev, Inzhenernaya ulitsa, 34, kv. 3, Sverdlovsk, all of U.S.S.R.

[21] Appl. No.: 584,011

[22] Filed: June 4, 1975

[30] Foreign Application Priority Data

June 5, 1974 U.S.S.R. .............................. 2026554

[51] Int. Cl.² .............................................. G21C 9/00
[52] U.S. Cl. ........................................ 176/38; 176/87

[58] Field of Search .......................... 176/37, 38, 87; 165/114

[56] References Cited

U.S. PATENT DOCUMENTS

| 3,022,238 | 2/1962 | Kolflat ............................. 204/193.2 |
| 3,115,450 | 12/1963 | Schanz .............................. 204/193.2 |
| 3,301,761 | 1/1967 | Johnson et al. ......................... 176/37 |
| 3,307,913 | 3/1967 | Chave ..................................... 176/37 |
| 3,321,374 | 5/1967 | Windle et al. .......................... 176/37 |
| 3,379,613 | 4/1968 | Tagami et al. .......................... 176/37 |
| 3,438,857 | 3/1969 | Sulzer .................................... 176/37 |
| 3,718,539 | 2/1973 | West et al. ............................. 176/37 |

FOREIGN PATENT DOCUMENTS

| 1,501,356 | 11/1966 | France. |
| 1,589,770 | 8/1970 | Germany ............................... 176/38 |
| 909,193 | 10/1962 | United Kingdom ................... 176/38 |
| 1,100,626 | 1/1968 | United Kingdom ................... 176/38 |

Primary Examiner—Samuel W. Engle
Assistant Examiner—Ralph Palo
Attorney, Agent, or Firm—Haseltine, Lake & Waters

[57] ABSTRACT

A system for mitigating the effects of an accident, such as loss of coolant, at a nuclear power plant, comprising a first container accommodating a nuclear reactor and its primary cooling system, and a second container communicating with the first container to receive and contain the air forced out therefrom as the pressure in the first container rises to an unusually high level as a result of vaporization caused by ebullition of the leaking coolant. In accordance with the invention, the first and second containers communicate through a conduit in which is placed a vapor condenser which is a bubbling device. To prevent the air forced out from the first container from returning thereto, a non-return valve is provided at the inlet to the second container. The first container also accommodates a supplementary condenser of the sprinkler type. Owing to air being forced out from the first container into the second one and vapor condensation in the former, a negative pressure develops, at the initial stage of the accident, in the second container, which is maintained over a long period of time. The occurrence of the negative pressure and its persistence over a long period of time preclude release of radioactive products to the environment.

5 Claims, 5 Drawing Figures

SYSTEM FOR MITIGATING THE EFFECTS OF AN ACCIDENT AT A NUCLEAR POWER PLANT

FIELD OF THE INVENTION

The present invention relates to nuclear power engineering, and more particularly to a system for mitigating the effects of an accident at a nuclear power plant, intended to protect the environment against radioactive contaminants which may result from accidents at nuclear power plants comprising nuclear reactors wherein the coolant is high-temperature and high-pressure water in a hermetically sealed cooling circuit.

BACKGROUND

What is known in the design of nuclear power plants as a "maximum design basis accident" implies a hypothetical accident involving loss of coolant which may occur as a result of an instantaneous rupture of the largest pipeline followed by an unimpeded outflow of the coolant from both sides of the break. In the case of an accident involving loss of coolant, radioactive products escape together with the coolant into the reactor room wherein a pressure rise occurs as a result of vaporization caused by ebullition of the coolant. This give rise to the possibility of release of radioactive products to the environment. To preclude contamination of the environment, nuclear power plants include hermetically sealed containments retaining the radioactive products released in the course of an accident.

Such hermetically sealed containments are designed for a maximum pressure of the vapor produced in the case of an accident at the expense of the entire released energy. Since in the event of an accident involving loss of coolant considerable quantities of vapor are produced, large-volume containments are required which are strong enough to withstand the action of a high-temperature and high-pressure vapor-air mixture. This requirement renders such safety systems substantially costly.

To reduce the costs of safety systems, designers try to minimize the pressure within the containment. This can be attained either by supplying coolant to condense the vapor or by dividing the containment into two chambers.

One of these chambers accomodates the nuclear reactor and its primary cooling circuit, while the other is intended to contain the air forced out of the first chamber in the case of an unusually high pressure rise as a result of vaporization caused by ebullition of the leaking coolant. Normally, passive condensers are arranged between said chambers.

In the case of an accident involving loss of coolant, the vapor produced as a result of boiling of the coolant mixes with the air with which the first chamber was filled prior to the accident, and the pressure in the first chamber rises to become higher than in the second chamber. The resulting pressure difference causes the vapor-air mixture to flow into a condenser in which the vapor is condensed, while the air enters the second chamber wherein the pressure starts to increase. Used as the passive vapor condensers are, for example, ice condensers or containers filled with water wherethrough the vapor-air mixture is bubbled. In the course of bubbling of the vapor-air mixture, the vapor is condensed, while the air passes through the water to enter the second chamber. To provide for an adequate condensing capacity, large amounts of water should be used. The use of containers with large amounts of water is apt to cause hydraulic shocks as the vapor-air mixture is being bubbled through the water, whereby stricter requirements have to be imposed on the mechanical strength of such containers and the costs involved in their construction become unduly high. Despite the employment of means for reducing the pressure in the above-described safety devices, excess pressure persists for a long period of time, and since the containment cannot be absolutely hermetic, it is practically impossible to completely rule out the possibility of escape of radioactive products to the environment. In order to keep the level of radioactive contamination below the tolerable limit, the degree of hermeticity of the containment should be extremely high, which is another factor adding to the total cost of the safety arrangement.

Also known in the art are systems for limiting the consequences of an accident, comprising two rooms, one of which accommodates a nuclear reactor with its cooling circuit, and in the other room, communicating with the first room through a valve, a pressure below atmospheric is permanently maintained by exhausting air therefrom. In the case of an accident involving loss of coolant, a vapor-air mixture enters the second room which accommodates a vapor condenser. The negativepressure in the second room prior to the accident and condensation of the vapor as the vapor-air mixture comes in during the accident result in the pressure in the second room remaining below atmospheric. The initial exhaustion in the second room being sufficient, the pressure in the first room can be brought to a subatmospheric level, too. However, such a system involves unduly high expenditures to build said second room and maintain negative pressure throughout the operating period.

Additionally, all the nuclear plant equipment, including the reactor, cooling circuit, fuel recharging system and the like, is enclosed in a containment. In the course of normal operation of the reactor, minor leakage of the coolant may occur with radioactive products of fission escaping therewith into the space confined within the containment, whereby the atmosphere in the containment may go below the radiation safety standards. Therefore, under normal operating conditions, access to the nuclear plant equipment enclosed in a hermetically sealed containment is limited.

SUMMARY OF THE INVENTION

The principal object of the present invention is to provide a system for mitigating the effects of an accident at a nuclear power plant, which will preclude release of fission products to the environment in the case of accidents involving loss of coolant, this being achieved by creating a negative pressure in a nuclear reactor container at the initial stage of the accident and maintaining this negative pressure over a long period of time.

Another object of the invention is to keep at a low level the maximum pressure in the hermetically sealed nuclear reactor container and pressure containers, thus minimizing the costs involved in the construction of these facilities.

Still another object of the invention is to improve the conditions of servicing the reactor container, as well as to ensure proper conditions for preparing the reactor for recharging before it is shut down.

These and other objects are attained in a system for mitigating the effects of an accident involving loss of coolant at a nuclear power plant, comprising a first container accommodating a nuclear reactor and its primary cooling system, a second container communicating with the first container to receive and contain the air forced out from the first container as the pressure therein rises as a result of coolant leakage, a passive vapor condenser arranged between said containers to condense the water vapor resulting from ebullition of the leaking coolant, the first and second containers communicating through a conduit having, at the inlet to the second container, a non-return valve preventing the air forced out from the first container from returning thereto, and a condenser which is substantially a bubbling device with at least one trough filled with a coolant and a housing arranged thereabove so that its inlet portion is lowered into the trough to form, with the walls of the trough, passages wherethrough vapor-air mixture is let in, the inlet portion of the housing being associated with the non-return valve, and according to the invention, a negative pressure is created in the first container immediately after the accident, the system being provided with a supplementary condenser of the sprinkler type, which is accommodated in the first container and actuated upon leakage of the coolant into the first container, the operation of this condenser being over when all of the vapour resulting from the accident has been condensed.

The proposed system for mitigating the effects of an accident may include a plurality of vapor condensers of the above-described type, arranged one above another and each being connected through an individual valve to the second container which is common for all of them.

The above-described system may also include a plurality of vapor condensers arranged one above another, each condenser being connected through an individual valve to its own second container, which means that there is a plurality of second containers corresponding in number to said vapor condensers.

In yet another embodiment, the proposed system may include a plurality of groups of vapor condensers, each group being connected to a second container common for all the condensers in that group, through an individual non-return valve. The vapor condensers may be arranged one above another.

The passive vapor condensers may be condensers of other types, such as ice condensers.

The term "first container" is meant, in the description of specific embodiments of the present invention that follows, to denote the totality of the hermetically sealed space accommodating the nuclear reactor, its cooling system and related facilities (such as ventilation installation, etc.), which become exposed to radiation as a result of an accident and which communicate with one another both prior to and after the accident. This hermetically sealed space also includes a conduit through which the vapor-air mixture formed as a result of ebullition of the leaking coolant enters the second container.

By the "second container" is here meant the pressure container, i.e. the hermetically sealed space containing the air forced out from the first container as a result of the accident, the pressure of that air being above atmospheric. After the accident, this space becomes isolated from the space confined within the first container by means of a non-return valve. The air forced out from the first container passes to the second container through the conduit interconnecting both containers.

BRIEF DESCRIPTION OF THE DRAWING

The invention will now be described in greater detail with reference to specific embodiments thereof, taken in conjunction with the accompanying drawings, wherein.

DETAILED DESCRIPTION

Figure 1:
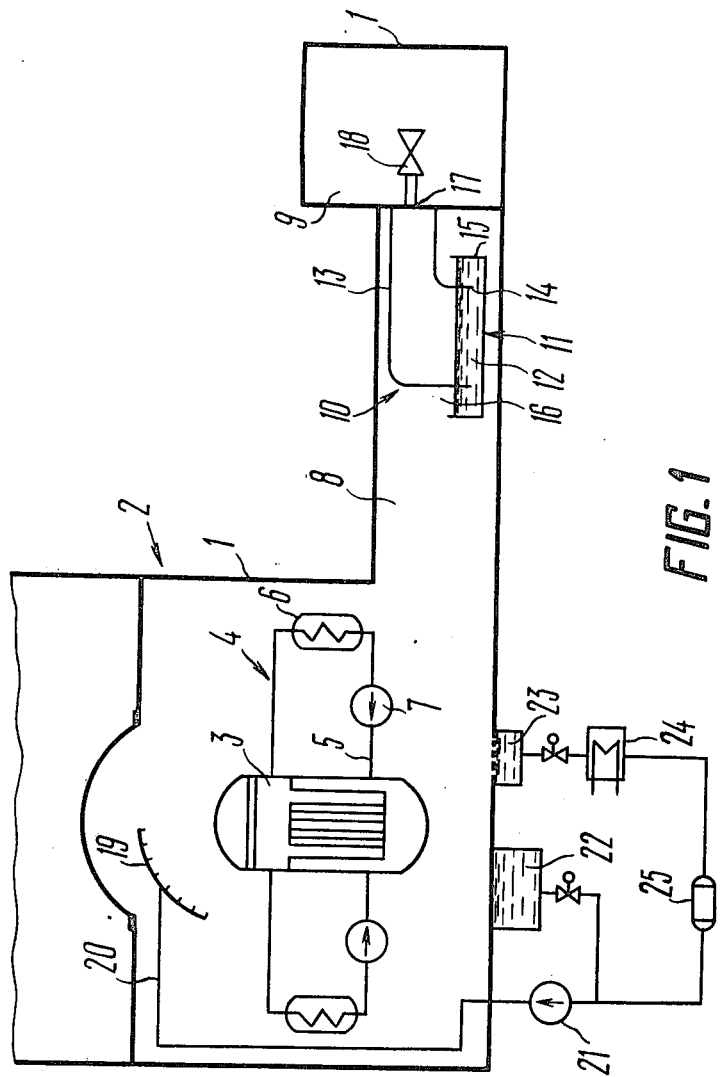
FIG. 1 is an elevation view of a system for mitigating the effects of an accident involving loss of coolant at a nuclear power plant, comprising a second container and a vapor condenser, according to the invention.

Referring now to the drawings, the system for mitigating the effects of an accident at a nuclear power plant (FIG. 1) comprises a containment 1 enveloping a first container 2 which accommodates a nuclear reactor 3 with a cooling system 4 including pipelines 5, a steam generator 6, a pump 7 and other equipment. The latter may include, for example, a ventillation installation, and the like (not shown). The first container 2 communicates through a conduit 8 with a second container 9. The free volume of the conduit 8 has been selected such that the amount of the air forced out by vapor formed as a result of ebulition of the leaking coolant is sufficient to create a negative pressure in the first container 2.

Placed in the conduit 8 is a vapor condenser 10 including at least one through 11 filled with a coolant 12 and a housing 13 whose inlet portion 14 is lowered into the trough 11 so as to be immersed into the coolant 12 and form, with walls 15 of the trough 11, passage 16 for a vapor-air mixture. An outlet portion 17 of the housing 13 is associated with a non-return valve 18 arranged at the inlet to the second container 9.

The first container 2 also accommodates a condenser 19 of the sprinkler type, connected through a pipeline 20 to a pump 21 delivering water directly from a tank 22 or from a pit 23 in the container 2 through a heat exchanger 24 and ion-exchange filter 25.

Figure 2:
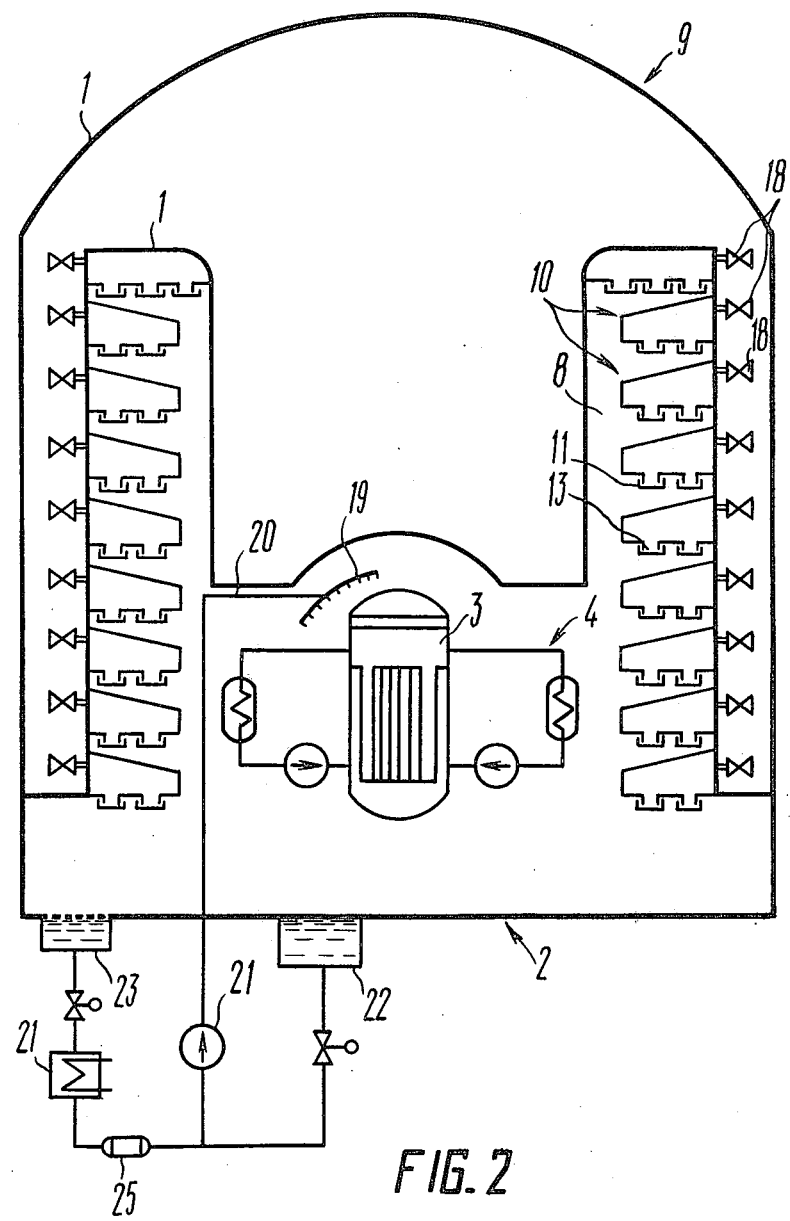
FIG. 2 shows an embodiment of the proposed system with a plurality of vapor condensers connected to a common second container with the first containers being arranged inside the latter.

Turning now to the embodiment of FIG. 2, the container 2 is arranged inside the container 9, while the conduit 8 accommodates a plurality of vapor condensers 10, each including several troughs 11 into which are lowered the inlet portions of the housings 13. Each condenser 10 is connected to the second container 9 common for all the condensers through an individual non-return valve 18. This embodiment permits reducing each trough in size through the use of a plurality of condensers, as well as cutting down the size of the hermetically sealed containment owing to the arrangement of the container 2 internally of the container 9, hence reducing the total cost of the plant.

Figure 3:
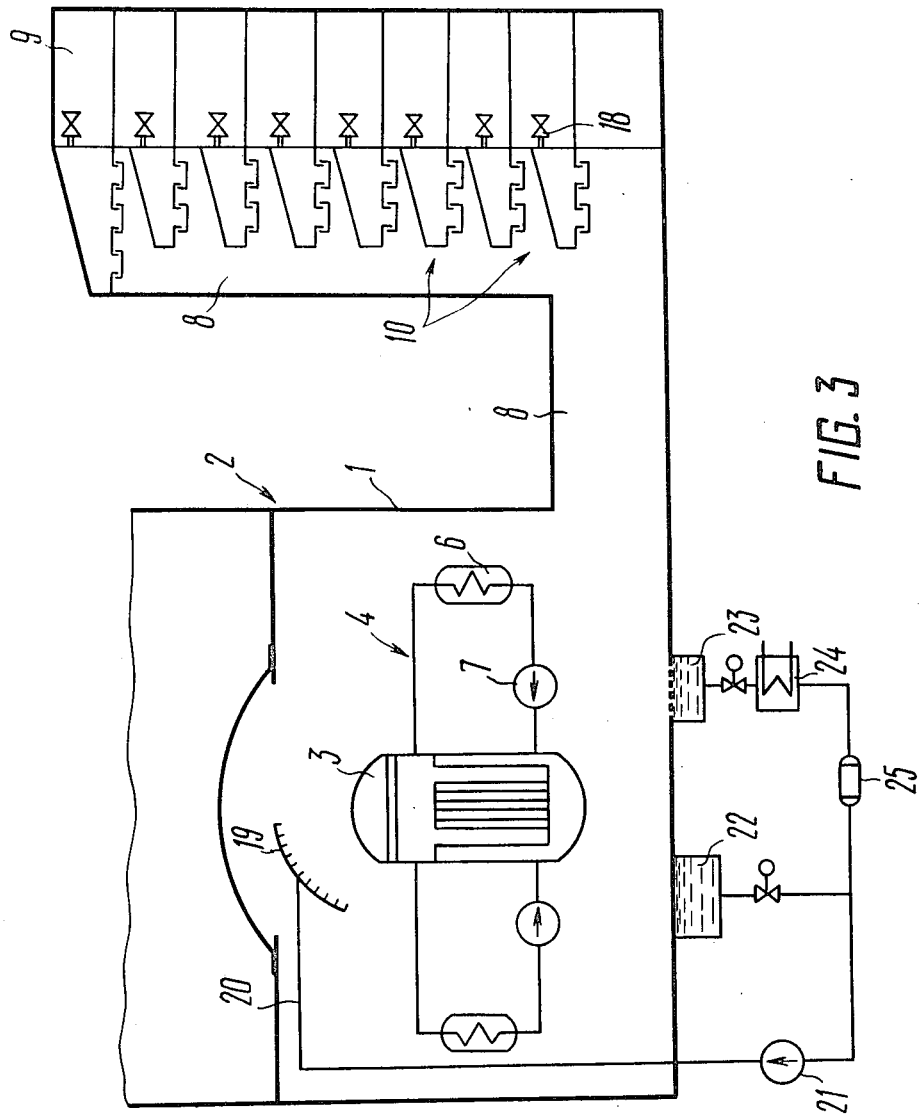
FIG. 3 shows another embodiment of the proposed system in which provision is made for a plurality of vapor condensers, each being connected to its own second container.

The embodiment illustrated in FIG. 3 includes several condensers 10, similar to those shown in FIG. 2, arranged in the conduit 8, each condenser 8 being connected through an individual non-return valve 18 (FIG. 3) to its own second container 9. This system is advantageous over that of FIG. 2 in that the operation of the vapor condensers 10 is improved through a more even distribution of vapor therebetween, and the reliability of the system is enhanced, accordingly.

The proposed system may have, in another embodiment (FIG. 4), groups of vapor condensers 10 arranged in the conduit 8, each condenser being provided with its own non-return valve 18 through which the first container 2 communicates with the second container 9 common for a respective group of condensers, the containers 9 being, in this case, arranged inside the conduit 8, which permits excluding, almost completely, a specially provided containment for the container 9, which is adjacent to the surrounding medium and in which the pressure, during and after the accident, exceeds the atmospheric level.

Figure 5:
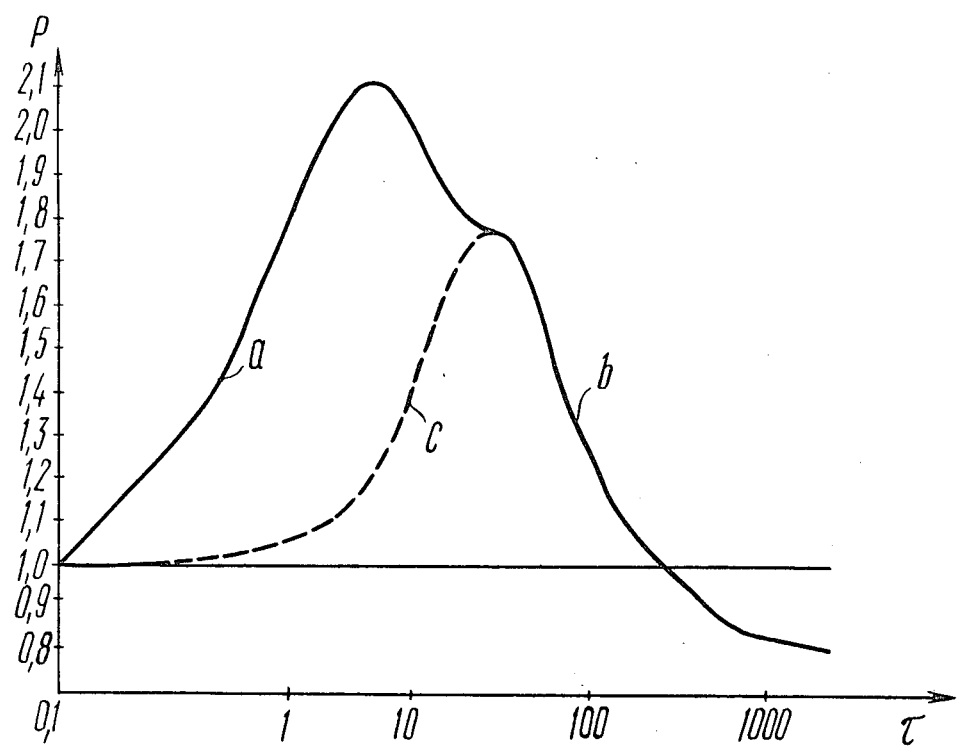
FIG. 5 is a graph showing pressure variations versus time, in the first and second containers, in the case of an accident involving loss of coolant.

The operation of the proposed system for mitigating the effects of an accident at a nuclear power plant will be described with reference to the graph (FIG. 5) showing pressure variations versus time, in the first and second containers, in the case of an accident.

In case of a break in the cooling circuit, the vapor formed as a result of ebullition of the leaking coolant fills the container 2 (FIG. 1) mingling with the air in that container. Therewith, the pressure in the container 2 and conduit 8 rises as indicated by portion "a" of the curve "b" in FIG. 5, and the resulting vapor-air mixture enters the condenser 10 forcing out the air in the conduit 8.

When the vapor-air mixture is bubbled through the coolant 12 in the condenser 10, the vapor is condensed, while the air is forced into the housing 13. As a result of the pressure rise inside the housing 13, relative to the pressure in the container 9, the non-return valve 18 is opened, and the air starts to flow into the container 9. The pressure in the container 9 rises as indicated by portion "c" of the curve of FIG. 5. By the end of the coolant leakage, the pressures in all containers become equal, and the non-return valve 18 is closed cutting off the air in the container 9.

The absolute value of the final pressure depends on the amount of air forced into the container 9. Minimum pressure corresponds to the case where only the air filling the conduit 8 prior to the accident is forced out, while maximum pressure corresponds to the case where the air filling, the conduit 8 and container 2 prior to the accident is forced out.

Once the pressures become equal, the air is no longer bubbled through the coolant 12, whereas condensation of the vapor on the relatively cold outer surfaces of the troughs 11 continues. Thereafter, due to the continuing vapor condensation, the pressure in the conduit 8 drops to a level below that of the pressure under the housing 13, and the coolant 12 starts to be forced out from the trough 11 into the conduit 8. The resulting flow of coolant results, in turn, in a faster condensation, and the pressure in the conduit 8 as well as container 2 starts to drop as indicated by portion "b " of the curve "ab".

The negative pressure is maintained over the rest of the accident period, simultaneously with vaporization in the reactor due to the afterheat, with the aid of the condenser 19 of the sprinkler type. The coolant is fed into the condenser 19 through the pipelines 20 by means of the pump 21 first from the tank 22 then, after the tank 22 is exhausted, through the heat exchanger 24 and ion-exchange filter 25 from the pits 23 in the container 2. Concurrently with vapor condensation in the container by sprinkling coolant through the condenser 19, the atmosphere in the container 2 is cleared of radioactive iodine $I^{131}$ which is trapped by the ion-exchange filter 25.

In the embodiment where the container 2 is arranged inside the container 9, the vapor-air mixture from the container 2 (FIG. 2) passes into the conduit 8 and is distributed between all the vapor condensers 10 wherein the vapor is condensed, while the air passes through the non-return valves 18 into the container 9 common for all the vapor condensers 10.

In the container 9, which is enclosed in a hermetically sealed containment, radiation-free conditions are ensured in normal operation of the power plant, owing to its being separated, by means of the non-return valves and water in the vapor condensers, from the cooling system. Therefore, during operation of the reactor, access to the container 9 can be allowed for servicing the equipment accommodated therein, such as cranes, fuel recharging mechanisms, recharging pool, etc. (not shown). If an accident occurs when there is somebody in the container 9, he can safety walk out therefrom within a short period of time. Thus, the radiation doses are minimized and safer conditions are ensured for the personnel servicing the plant during its operation.

In the system shown in FIG. 3, the vapor-air mixture is evenly distributed between all the vapor condensers 10, and as it passes through the individual non-return valves 18, the air enters in the containers 9 of respective vapor condensers 10.

Figure 4:
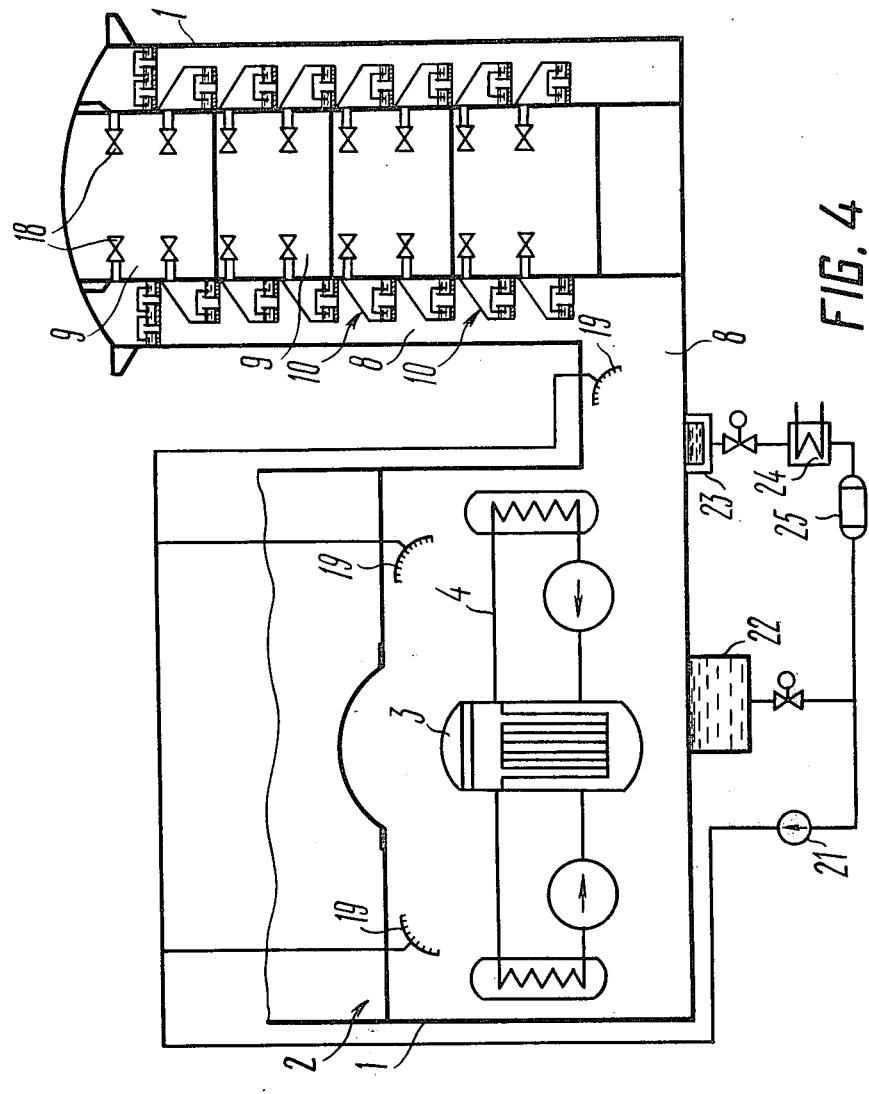
FIG. 4 shows still another embodiment of the proposed system in which groups of vapor condensers are connected, each, to a second container common for a particular group, the second container being arranged inside the conduit.

In the system of FIG. 4, the vapor-air mixture is distributed among the groups of vapor condensers 10, and as the air passes through the non-return valves 18, it gets into the containers 9 common of respective groups of vapor condensers 10 and arranged inside the conduit 8, which allows the containers 9 wherein the pressure is above the atmospheric level to be isolated from the environment by means of two hermetically sealed containments.

The use of the systems shown in FIGS. 3 and 4 permits cranes, fuel recharging mechanisms, recharging pools and the like to be arranged outside the hermetically sealed containment, whereby free access is ensured to this equipment and it can be serviced at any time during operation of the reactor.

The proposed system for mitigating the effects of an accident involving loss of coolant at a nuclear power plant offers the following advantages over the prior art safety systems.

By creating, within a short period of time, a negative pressure in the reactor containers, wherein coolant leakage and release of fission products take place, it is possible, 10 to 15 minutes after the onset of an accident, to completely stop radioactive products from escaping to the environment, which substantially improves protection of the environment against radioactive contamination.

Even in the case of a hypothetical accident involving complete fuel-element meltdown when the bottom of the reactor container is assumed to melt away, the presence of a negative pressure in the reactor container practically rules out release of radioactive gaseous products to the environment. In a safety system where a positive pressure is maintained, escape of radioactive gaseous products to the environment cannot be precluded.

Maximum absolute pressure in the reactor and pressure containers is two-three times lower than in systems with total pressure containments. Reducing this pressure permits a drastic cutdown in the total costs of such a system.

The proposed system also improves the conditions for servicing conditions during operation of the reactor.

What is claimed is:

1. A system for mitigating the effects of an accident at a nuclear power plant, comprising: a first container accommodating a nuclear reactor and its primary cooling system, wherein an unusually high pressure rise can occur as a result of vaporization caused by ebullition of the leaking coolant, the resulting vapor mingling with air to form a vapor-air mixture; a second container arranged separately from said first container and communicating therewith to receive and contain air partially forced out from said first container as the pressure therein rises and the vapor-air mixture is formed; a conduit between the first and second containers, through which the interiors of said containers communicate and said vapor-air mixture passes from said first container into the second container as a result of said pressure rise; a passive vapor condenser placed in said conduit across the flow of said vapor-air mixture, said condenser being substantially a bubbling device comprising a trough filled with a coolant and a housing arranged above said trough with an inlet portion of said housing being lowered into said trough so that formed between the walls of said trough and the inlet portion of said housing are passages wherethrough said vapor-air mixture is introduced into the trough under the pressure rise in the first container, the vapor being condensed in the trough as said mixture passes through said coolant, the air filling the inner space of said housing in which a pressure rise occurs, the housing having an outlet portion connected to the inlet of said second container; a non-return valve mounted at the inlet to said second container and controlling air flow from said housing to said second container, whereby the latter can be cut off from said first container and the air is prevented from returning thereto, said valve being opened when the pressure of the air accumulated in said housing rises and exceeds the pressure in said second container for passing the air into said second container, while closure of the valve takes place when the pressures in said housing and second container become equal; and a supplementary condenser of the sprinkler type, disposed in said first container and actuated upon leakage of said coolant, said condenser condensing the vapor filling said first container after air has been forced out therefrom into said second container, whereafter a negative pressure develops in said first container, precluding release of radioactive products to the environment, the operation of said condenser of the sprinkler type being completed when all of the vapor resulting from the accident has been condensed.

2. A system for mitigating the effects of an accident involving loss of coolant at a nuclear power plant as claimed in claim 1, comprising a plurality of said passive vapor condensers, each being substantially a bubbling device in the form of a trough filled with a coolant and a housing arranged thereabove so that the outlet portion of each housing is adjacent to a common said second container isolated from said first container and intended for receiving and containing the air forced out from the first container, each housing being provided, at the inlet to said second container, with one said non-return valve which prevents the air in the second container from returning to the first container.

3. A system for mitigating the effects of an accident involving loss of coolant at a nuclear power plant as claimed in claim 1, comprising a plurality of said second containers for receiving and containing the air forced out from said first container, and a plurality of said passive vapor condensers, each being made in the form of a trough filled with a coolant and a housing arranged thereabove so that the outlet portion of the housing is adjacent to a respective second container, a respective said non-return valve preventing the air in the second container from returning to the first container being provided at the inlet to each second container.

4. A system for mitigating the effects of an accident involving loss of coolant at a nuclear power plant as claimed in claim 1, comprising a plurality of said second containers for receiving and containing the air forced out from said first container, and a plurality of said passive vapor condensers, each being made in the form of a trough filled with a coolant and a housing arranged thereabove; said condensers being arranged in groups, the outlet portions of said housings being adjacent to said second container common for a respective group of condensers, a respective said non-return valve preventing the air in the second container from returning to the first container being provided at the inlet to each second container.

5. A system for mitigating the effects of an accident involving loss of coolant at a nuclear power plant as claimed in claim 1, comprising a plurality of said passive vapor condensers arranged one above another.

* * * * *